US008504756B2

United States Patent
Kothamasu et al.

(10) Patent No.: US 8,504,756 B2
(45) Date of Patent: Aug. 6, 2013

(54) SYSTEM, CIRCUIT AND METHOD FOR IMPROVING SYSTEM-ON-CHIP BANDWIDTH PERFORMANCE FOR HIGH LATENCY PERIPHERAL READ ACCESSES

(75) Inventors: Srinivasa Rao Kothamasu, Karnataka (IN); Sreenath Shambu Ramakrishna, Karnataka (IN)

(73) Assignee: LSI Corporation, San Jose, CA (US)

( * ) Notice: Subject to any disclaimer, the term of this patent is extended or adjusted under 35 U.S.C. 154(b) by 312 days.

(21) Appl. No.: 13/118,493

(22) Filed: May 30, 2011

(65) Prior Publication Data
US 2012/0311209 A1    Dec. 6, 2012

(51) Int. Cl.
G06F 13/36    (2006.01)
G06F 13/40    (2006.01)

(52) U.S. Cl.
CPC ................................. *G06F 13/4027* (2013.01)
USPC .......................................... 710/315; 710/306

(58) Field of Classification Search
USPC ............................ 710/305–315, 52–61, 8–19
See application file for complete search history.

(56) References Cited

U.S. PATENT DOCUMENTS

| 6,058,464 A * | 5/2000 | Taylor ........................... 711/217 |
| 6,532,511 B1 | 3/2003 | Brooks |
| 2003/0188062 A1* | 10/2003 | Luse et al. .................... 710/104 |
| 2008/0189453 A1 | 8/2008 | Mun |
| 2008/0270656 A1* | 10/2008 | Bracamontes Del Toro . 710/110 |
| 2008/0270667 A1* | 10/2008 | Bracamontes Del Toro . 710/306 |
| 2009/0024783 A1* | 1/2009 | Rhim et al. .................... 710/316 |
| 2011/0055439 A1* | 3/2011 | Chen et al. ...................... 710/57 |
| 2011/0289253 A1* | 11/2011 | Mangano et al. ............. 710/310 |

\* cited by examiner

*Primary Examiner* — Raymond Phan
(74) *Attorney, Agent, or Firm* — Mendelsohn, Drucker & Associates, P.C.; Steve Mendelsohn

(57) ABSTRACT

A system, circuit and method for improving system-on-chip (SoC) bandwidth performance for high latency peripheral read accesses using a bridge circuit are disclosed. In one embodiment, the SoC includes the bridge circuit, one or more bus masters, at least one high bandwidth bus slave and at least one low bandwidth bus slave that are communicatively coupled via a high bandwidth bus and a low bandwidth bus. Further, the bus masters access the at least one low bandwidth bus slave by issuing an early read transaction request in advance to a scheduled read transaction request. Furthermore, the bridge circuit receives the early read transaction request and fetches data associated with the early read transaction request. In addition, the bridge circuit receives the scheduled read transaction request. The fetched data is then sent to the bus masters upon receiving the scheduled read transaction request.

21 Claims, 7 Drawing Sheets

| CYCLE | CY1 | CY2 | CY3 | CY4 | CY5 | CY6 | CY7 | CY8 | CY9 | CY10 | CY11 |
|---|---|---|---|---|---|---|---|---|---|---|---|
| HIGH BANDWIDTH_CTRL | H0_R | H1_W | P0_W | P1_R | H2_R | H2_R | H2_R | H2_R | P2_R | | |
| HIGH BANDWIDTH_WRITE _DATA | | | H1_WD | P0_WD | | | | | | | |
| HIGH BANDWIDTH READ_DATA | | H0_RD | | | | | | P1_RD | H2_RD | | P2_RD |
| LOW BANDWIDTH TRANS_FLOW | | | | | P0_W (S) | P0_W (A) | P1_R (S) | P1_R (A) | | P2_R (S) | P2_R (A) |

FIG. 3

| CYCLE | CY1 | CY2 | CY3 | CY4 | CY5 | CY6 | CY7 |
|---|---|---|---|---|---|---|---|
| 602 — HIGH BANDWIDTH_USER | | | P1_R | | P2_R | | |
| 604 — HIGH BANDWIDTH_CTRL | H0_R | H1_W | P0_W | P1_R | H2_R | P2_R | |
| 606 — HIGH BANDWIDTH_WRITE_DATA | | | H1_WD | P0_WD | | | |
| 608 — HIGH BANDWIDTH READ_DATA | | H0_RD | | | P1_RD | H2_RD | P2_RD |
| 610 — LOW BANDWIDTH TRANS_FLOW | | | | | P0_W (S) | P0_W (A) | |
| 612 — LOW BANDWIDTH_EARLY_READ _TRANS_FLOW | | | | P1_R (S) | P1_R (A) | P2_R (S) | P2_R (A) |

SYSTEM, CIRCUIT AND METHOD FOR IMPROVING SYSTEM-ON-CHIP BANDWIDTH PERFORMANCE FOR HIGH LATENCY PERIPHERAL READ ACCESSES

TECHNICAL FIELD

The present invention relates generally to a system-on-chip (SoC), and more particularly to improving bandwidth performance on the SoC during high latency peripheral read accesses.

BACKGROUND

A system-on-chip (SoC) usually includes one or more bus masters and bus slaves. Typically, the bus masters and the bus slaves operate at different frequencies requiring different bandwidths. Therefore, the SoC includes a high bandwidth bus, such as an advanced high-performance bus (AHB), to which bus slaves (e.g., peripherals, modules, and/or interfaces) operating at a high bandwidth are connected, and a low bandwidth bus, such as an advanced peripheral bus (APB), to which bus slaves operating at a low bandwidth are connected. However, when the bus slaves operating at the low bandwidth are accessed via the high bandwidth bus, the overall system bandwidth may be significantly reduced due to higher access latency. Especially, this can be an issue during read accesses as the write accesses can be buffered to isolate from such bandwidth reduction issues. For example, in a read access, until the requested data is fetched from the bus slave(s) operating at the low bandwidth, the bus masters may not issue another read/write transaction request and the high bandwidth bus can be virtually choked till the issued read transaction is completed. This can result in loss of throughput of several cycles in the bus masters due to the peripheral latency and inactivity on the high bandwidth bus.

SUMMARY

System, circuit and method for improving system-on-chip (SoC) bandwidth performance for high latency peripheral read accesses are disclosed. In one embodiment, the SoC includes a bridge circuit, one or more bus masters, at least one high bandwidth bus slave and at least one low bandwidth bus slave that are communicatively coupled to the one or more bus masters via a high bandwidth bus and a low bandwidth bus, respectively. The method includes processing an early read transaction request received from the one or more bus masters and initiating a read transaction to one of the at least one low bandwidth bus slave via the low bandwidth bus by the bridge circuit. Further, data is read from the at least one low bandwidth bus slave in response to the early read transaction request received from the one or more bus masters and the data is then converted to a high bandwidth bus read data. Furthermore, the data corresponding to the early read transaction request is stored by the bridge circuit.

In addition in this embodiment, a scheduled read transaction request received from the one or more bus masters is processed. The converted high bandwidth read data is then transferred to one of the one or more bus masters via the high bandwidth bus by the bridge circuit in response to the scheduled read transaction request.

According to another aspect of the present invention, the SoC includes the one or more bus masters, at least one high bandwidth bus slave and the high bandwidth bus communicatively coupled to the one or more bus masters and the at least one high bandwidth bus slave. Further, the SoC includes the low bandwidth bus, the bridge circuit and at least one low bandwidth bus slave. The bridge circuit is coupled between the high bandwidth bus and the low bandwidth bus. Furthermore, the at least one low bandwidth bus slave is coupled to the low bandwidth bus. In addition, the one or more bus masters are configured to access the at least one low bandwidth bus slave. Moreover, the one or more bus masters are configured to issue the early read transaction request in advance of the scheduled read transaction request associated with one of the at least one low bandwidth bus slave.

Further, the bridge circuit is configured to receive the early read transaction request and convert the early read transaction request to a low bandwidth bus read transaction request. Furthermore, the low bandwidth bus read transaction request is sent to one of the at least one low bandwidth bus slave via the low bandwidth bus to fetch data associated with the early read transaction request. In addition, the bridge circuit is configured to receive the scheduled read transaction request and convert the scheduled read transaction request to a low bandwidth bus read transaction request. The fetched data associated with the early read transaction request corresponding to the one of the at least one low bandwidth bus slave is then sent to the one or more bus masters via the bridge circuit and the high bandwidth bus upon receiving the scheduled read transaction request.

The methods, systems and circuits disclosed herein may be implemented in any means for achieving various aspects, and other features will be apparent from the accompanying drawings and from the detailed description that follows.

BRIEF DESCRIPTION OF THE DRAWINGS

Various embodiments are described herein with reference to the drawings, wherein:

FIG. 3 is a table showing exemplary transaction flows via a high bandwidth bus to a low bandwidth bus in the SoC, such as those shown in FIG. 1, in the context of the invention;

FIG. 6 is a table showing transaction flows via the high bandwidth bus to the low bandwidth bus in the SoC, such as those shown in FIG. 4, according to an embodiment of the invention.

The drawings described herein are for illustration purposes only and are not intended to limit the scope of the present invention in any way.

DETAILED DESCRIPTION

A system, circuit and method for improving system-on-chip (SoC) bandwidth performance for high latency peripheral read accesses are disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined by the appended claims.

Figure 1:
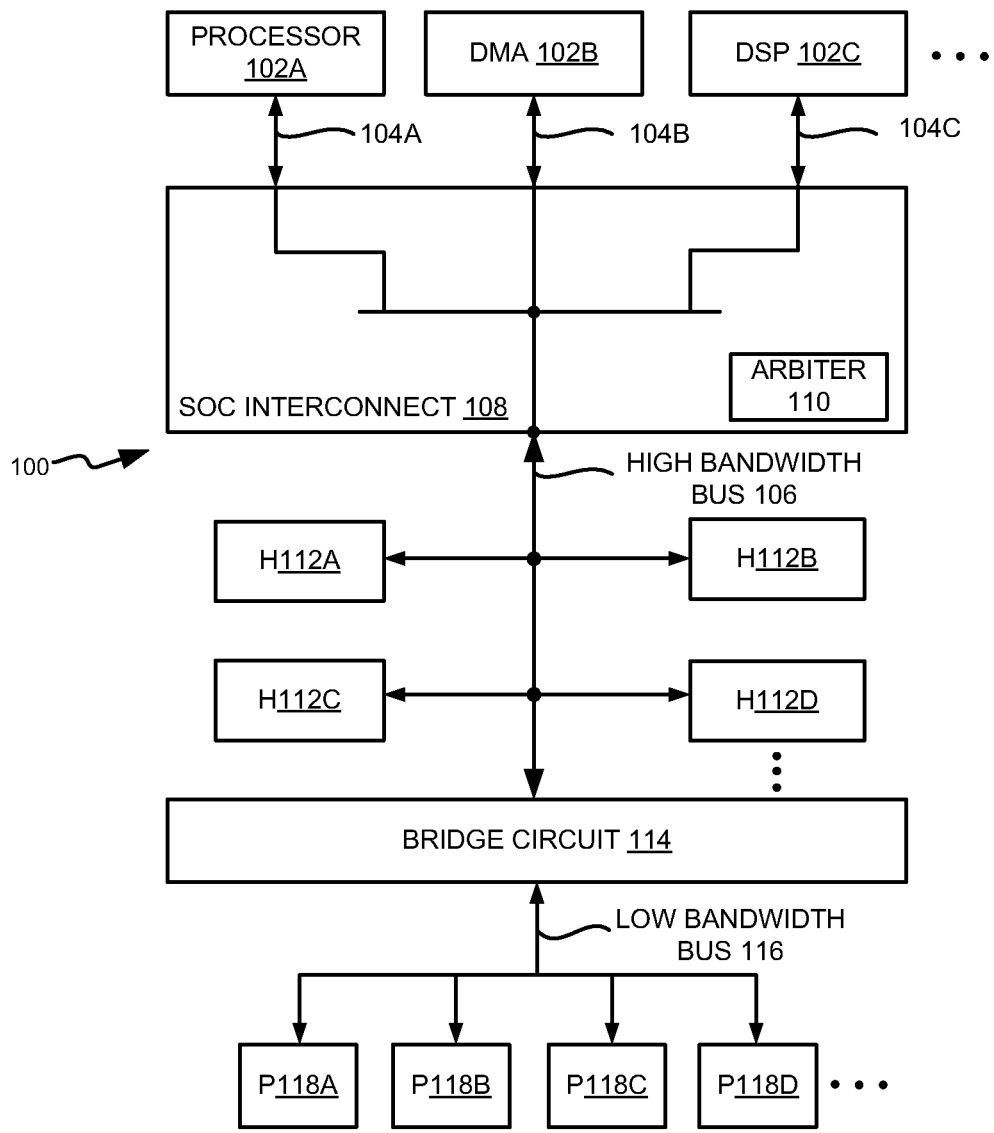
FIG. 1 is a block diagram illustrating major elements of a system-on-chip (SoC) and their interconnectivity, in the context of the invention.

FIG. 1 is a block diagram illustrating major elements of a SoC 100 and their interconnectivity, in the context of the invention. As shown, FIG. 1 includes one or more bus masters 102A-C. Exemplary bus masters 102A-C include a processor 102A, a direct memory access (DMA) 102B, a digital signal processor (DSP) 102C and/or any other bus master capable of initiating read/write transaction requests. Further as shown in FIG. 1, the SoC 100 includes a SoC interconnect 108, at least one high bandwidth bus slave H112A-D, a bridge circuit 114 and at least one low bandwidth bus slave P118A-D. Exemplary high bandwidth bus slaves H112A-D include a peripheral DMA and/or any other processing module capable of interacting with the bus masters 102A-C. Exemplary low bandwidth bus slaves P118A-D include peripheral devices such as a general purpose I/O (GPIO), a universal asynchronous receiver/transmitter (UART), a synchronous serial peripheral interface (SSP) and the like. Furthermore as shown in FIG. 1, the SoC interconnect 108 includes an arbiter 110.

In addition as shown in FIG. 1, the bus masters 102A-C are communicatively coupled to the SoC interconnect 108 via bus master interfaces 104A-C. Also as shown in FIG. 1, the SoC 100 includes a high bandwidth bus 106 which communicatively couples the bus masters 102A-C to the high bandwidth bus slaves H112A-D via the SoC interconnect 108. Exemplary high bandwidth bus 106 includes an advanced high performance bus (AHB), an advanced extensible interface (AXI) or any other bus capable of providing similar bus bandwidth characteristics.

Moreover as shown in FIG. 1, the bridge circuit 114 is coupled between the high bandwidth bus 106 and a low bandwidth bus 116. Exemplary low bandwidth bus 116 includes an advanced peripheral bus (APB) or any other bus capable of providing similar bus bandwidth characteristics. Typically, the high bandwidth bus 106 supports a pipelined operation that is capable of issuing outstanding transaction and the low bandwidth bus 116 supports a non-pipelined operation.

In operation, a read/write transaction request sent by the bus masters 102A-C to the high bandwidth bus slaves H112A-D via the high bandwidth bus 106 is serviced in two phases, where the first phase includes a control phase and the second phase includes a read/write data phase. In the control phase, the bus masters 102A-C issue control information for read/write transaction request to one of the high bandwidth bus slaves H112A-D. In the read/write data phase, the bus masters 102A-C either reads or writes the data from or to the associated one of the high bandwidth bus slaves H112A-D to service the read/write transaction request.

Further, a read/write transaction request sent by the bus masters 102A-C to the low bandwidth bus slaves P118A-D via the bridge circuit 114 is completed within a minimum of two cycles, where the first cycle includes a setup phase and the second cycle includes an access phase. The access phase can get further extended based on the delay in accessing the low bandwidth bus slaves P118A-D. This is explained in more detail with reference to FIG. 3.

Figure 2:
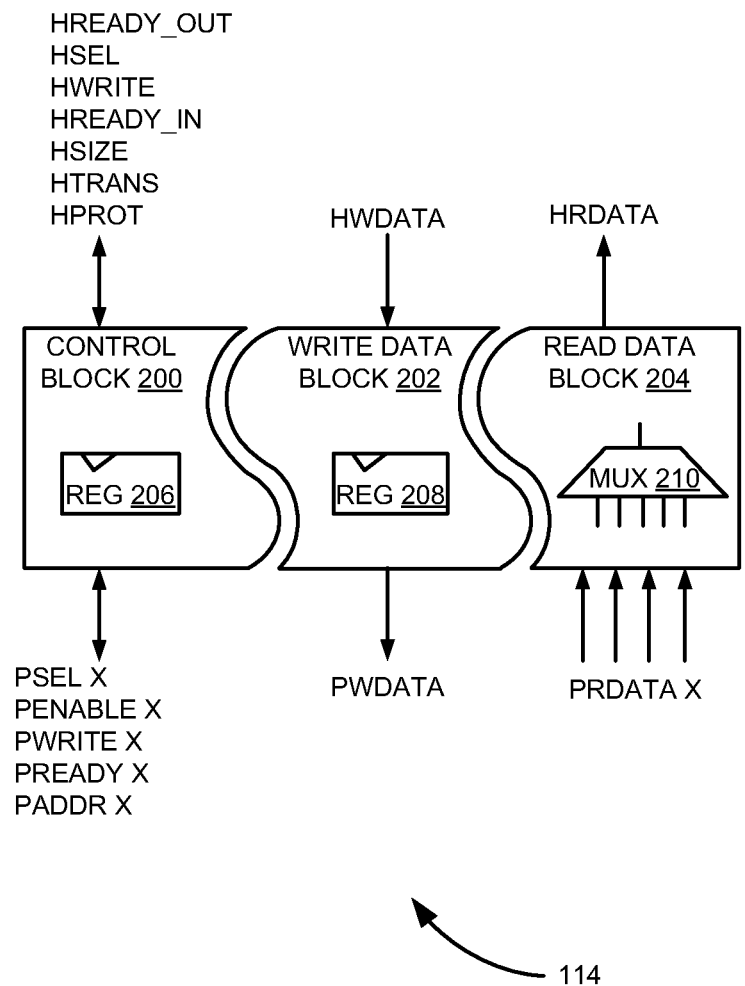
FIG. 2 is a block diagram illustrating major elements of a bridge circuit of the SoC, such as those shown in FIG. 1, in the context of the invention.

Referring now to FIG. 2, which illustrates a block diagram of major elements of the bridge circuit 114 of the SoC 100, such as those shown in FIG. 1, in the context of the invention. Particularly, FIG. 2 illustrates the bridge circuit 114 including a control block 200, a write data block 202 and a read data block 204. Further as shown in FIG. 2, the control block 200 includes a register stage (REG) 206, the write data block 202 includes another register stage (REG) 208 and the read data block 204 includes a multiplexer (MUX) 210.

In operation, the bridge circuit 114 is configured to convert information that is in a high bandwidth bus format coming via the high bandwidth bus 106 to information in a low bandwidth bus format that can be output via the low bandwidth bus 116 and vice versa. As shown in FIG. 2, the control block 200 converts control information in the high bandwidth bus format coming via the high bandwidth bus 106 to the low bandwidth bus format output via the low bandwidth bus 116 and vice versa. The control information in the high bandwidth bus format coming via the high bandwidth bus 106 includes control signals, such as a ready_out (HREADY_OUT), a slave select (HSEL), a read/write control (HWRITE), a ready_in (HREADY_IN), a data transfer width (HSIZE), a transaction type (HTRANS), a protection info (HPROT) and the like. The associated converted control information in the low bandwidth bus format output via the bridge circuit 114 to the low bandwidth bus 116 includes control signals, such as a slave select (PSEL X) where X indicates one of the low bandwidth bus slaves P118A-D, a slave enable (PENABLE X), a read/write control (PWRITE X), a slave ready (PREADY X), a slave address (PADDR X) and the like. The control information listed above may vary based on the protocol used by the high bandwidth bus 106 and the low bandwidth bus 116.

Further in operation, the write data block 202 receives high bandwidth write data (HWDATA), associated with a write transaction, from the bus masters 102A-C via the high bandwidth bus 106. The HWDATA is in the high bandwidth bus format. Further, the received HWDATA is converted to low bandwidth write data (PWDATA) by the write data block 202. The PWDATA is in the low bandwidth bus format. Furthermore, the write data block 202 forwards the PWDATA to associated one of the low bandwidth bus slaves P118A-D via the low bandwidth bus 116.

Furthermore in operation, the read data block 204 receives low bandwidth read data (PRDATA X), associated with a read transaction, from one of the low bandwidth bus slaves P118A-D via the low bandwidth bus 116. The PRDATA X is in the low bandwidth bus format. In addition, the read data block 204 converts the PRDATA X to high bandwidth read data (HRDATA). The HRDATA is in the high bandwidth bus format. After completing the conversion, the HRDATA is forwarded to the bus masters 102A-C via the high bandwidth bus 106.

Furthermore as shown in FIG. 2, the MUX 210 in the read data block 204 receives the PRDATA X from one of the low bandwidth bus slaves P118A-D via the low bandwidth bus 116. However, as shown in FIG. 2, the MUX 210 forwards the data (PRDATA) associated with the read transaction from one of the low bandwidth bus slaves P118A-D in a given cycle.

Referring now to FIG. 3, a table 300 showing exemplary transaction flows via the high bandwidth bus 106 to the bridge circuit 114 and then to the low bandwidth bus 116 in the SoC 100, such as those shown in FIG. 1, is illustrated, in the context of the invention. The transaction flows include the control information and read/write data access information coming from the bus masters 102A-C via the high bandwidth bus 106 and going via the low bandwidth bus 116 and vice versa. In the table 300, HX_Y represents a transaction Y, where Y is a read (R) or a write (W) transaction associated with a high bandwidth bus slave HX, wherein X is any one of the high bandwidth bus slaves H112A-D. Further, PX_Y represents a transaction Y, where Y is a read (R) or a write (W) transaction associated with a low bandwidth bus slave PX, wherein X is any one of the low bandwidth bus slaves P118A-D.

As shown in the table 300, each column includes an exemplary cycle, such as cycle 1 (CY1), cycle 2 (CY2) and so on. Further as shown in the table 300, a row 302 includes high bandwidth control information (HIGH BANDWIDTH_CTRL), on the high bandwidth bus 106, associated with the high bandwidth bus slaves H112A-D and the low bandwidth bus slaves P118A-D. Furthermore as shown in the table 300, a row 304 includes high bandwidth write data (HIGH BANDWIDTH_WRITE_DATA) information associated with the high bandwidth bus slaves H112A-D and the low bandwidth bus slaves P118A-D issued by the bus masters 102A-C via the high bandwidth bus 106. Also as shown in the table 300, a row 306 includes high bandwidth read data (HIGH BANDWIDTH_READ_DATA) information associated with the high bandwidth bus slaves H112A-D and the low bandwidth bus slaves P118A-D delivered to the bus masters 102A-C via the high bandwidth bus 106. In addition as shown in the table 300, a row 308 includes low bandwidth transaction flow (LOW BANDWIDTH_TRANS_FLOW) information associated with the low bandwidth bus slaves P118A-D delivered through the low bandwidth bus 116.

Now, referring to cycle 1 (CY1) shown in the table 300, a read transaction request control information H0_R, as shown in the row 302, is issued by one of the bus masters 102A-C to access the high bandwidth bus slave H112A via the high bandwidth bus 106. The transaction H0_R associated with the high bandwidth bus slave H112A is serviced substantially immediately in cycle 2 (CY2). In CY2, read data H0_RD, as shown in the row 306, associated with the transaction H0_R, is read from the high bandwidth bus slave H112A and transferred to the associated one of the bus masters 102A-C. In parallel, in CY2, new write transaction request control information H1_W, as shown in the row 302, is issued from one of the bus masters 102A-C to access the high bandwidth bus slave H112B via the high bandwidth bus 106. The transaction H1_W is issued in parallel with H0_RD, in the row 306, as the control and the data paths are independent. Also, this is enabled by the pipelined operation supported by the high bandwidth bus 106. Similar to the transaction H0_R, the transaction H1_W associated with the high bandwidth bus slave H112B is also serviced substantially immediately in cycle 3 (CY3).

In CY3, write data H1_WD, as shown in the row 304, associated with the transaction H1_W, is obtained from the associated one of the bus masters 102A-C to complete the transaction H1_W. Further, in CY3, write transaction request control information P0_W, as shown in the row 302, is issued by one of the bus masters 102A-C to access the low bandwidth bus slave P118A. In cycle 4 (CY4), the write data P0_WD, as shown in the row 304, associated with the transaction P0_W, is obtained from one of the bus masters 102A-C. Since the transaction P0_W is accessing the low bandwidth bus slave P118A, the transaction P0_W and the P0_WD information in the high bandwidth bus format is converted to the low bandwidth bus format by the bridge circuit 114. In addition, the low bandwidth bus slave P118A services the transaction P0_W after the converted P0_W and P0_WD information are available. Therefore, typically, two cycles are required to obtain the converted P0_W and P0_WD information. After, the converted P0_W and P0_WD information is obtained, the transaction P0_W is serviced in the two phases, i.e., the setup phase (S) in cycle 5 (CY5) (P0_W (S)) and the access phase (A) in cycle 6 (CY6) (P0_W (A)), as shown in the row 308. Due to the delay in servicing the transaction P0_W, a subsequent read transaction request P1_R issued in CY4 is delayed to the low bandwidth slaves P118A-D.

Also in CY4, the read transaction request control information P1_R, as shown in the row 302, is issued by one of the bus masters 102A-C to access the low bandwidth bus slave P118B. Since P1_R is also accessing one of the low bandwidth bus slaves P118A-D, it is buffered by the bridge circuit 114 and serviced after the transaction P0_W is completed in CY6. Therefore, P1_R is serviced in cycle 7 (CY7) (P1_R(S)) and cycle 8 (CY8) (P1_R (A)), as shown in the row 308. Further, the read data P1_RD, as shown in the row 306, associated with the transaction P1_R, is read from the low bandwidth bus slave P118B and obtained in CY8. As a result of the transaction P1_R being serviced, the transaction H2_R issued in CY5 will further be delayed. In CY5, the read transaction request control information H2_R, as shown in the row 302, is issued by one of the bus masters 102A-C to access the high bandwidth bus slave H112C. However, the transaction H2_R is not serviced until the previous transaction P1_R is completed in CY8 due to the bus pipelined dependency. Further, the high bandwidth bus 106 is blocked until the transaction P1_R is completed and the read data P1_RD is obtained, as shown in the row 306.

In cycle 9 (CY9), the transaction H2_R, shown in the row 302, which was held from CY5, is serviced and the read data H2_RD, as shown in the row 306, is obtained from the high bandwidth bus slave H112C. In parallel, in CY9, other read transaction request control information P2_R, as shown in the row 302, is issued to access the low bandwidth bus slave P118C. The transaction P2_R is serviced in the subsequent cycles, cycle 10 (CY10) (P2_R (S)) and cycle 11 (CY11) (P2_R (A)), as shown in the row 308. Further, the read data P2_RD, associated with the transaction P2_R, is read from the low bandwidth bus slave P118C and obtained in CY11, as shown in the row 306. The above described transaction flows show the delay in servicing the read transaction requests associated with the low bandwidth bus slaves P118A-D and the loss of cycle time in the high bandwidth bus 106 during the servicing of the read transaction requests. This delay can be significantly reduced by using a bridge circuit 430. This is explained in more detail with reference to FIGS. 4, 5 and 6.

Figure 4:
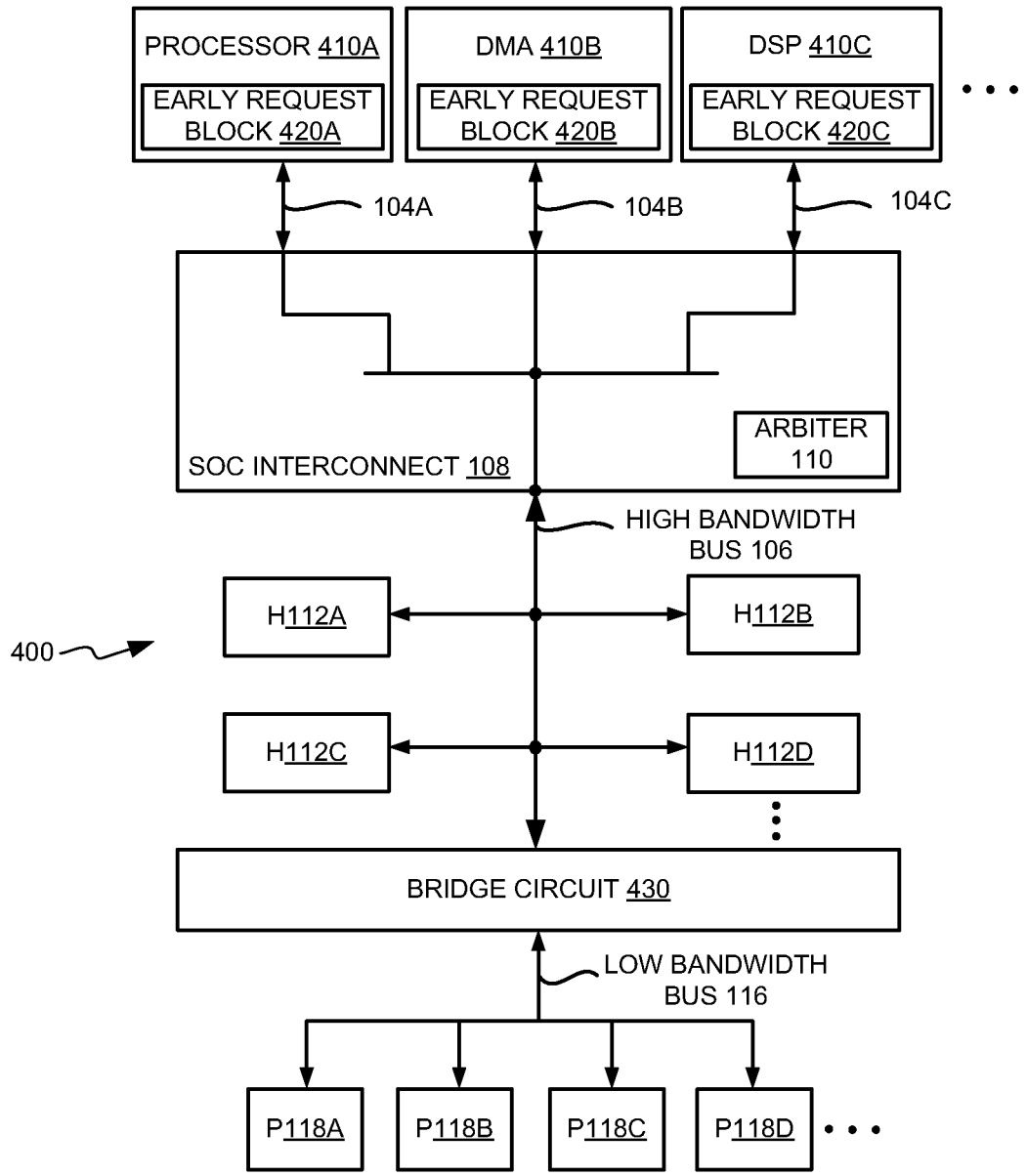
FIG. 4 is a block diagram illustrating major elements of a SoC and their interconnectivity, according to an embodiment of the invention.

Referring now to FIG. 4, which illustrates a block diagram of major elements of a SoC 400 and their interconnectivity, according to an embodiment of the invention. The SoC 400, shown in FIG. 4, is similar to the SoC 100 shown in FIG. 1, except the SoC 400 includes one or more bus masters 410A-C and a bridge circuit 430. Exemplary bus masters 410A-C include a processor 410A, a DMA 410B, a DSP 410C and/or any other bus master capable of initiating read/write transaction requests. Further, as shown in FIG. 4, the bus masters 410A-C include early request blocks 420A-C, respectively. Also as shown in FIG. 4, the SoC 400 includes the SoC interconnect 108, the high bandwidth bus slaves H112A-D and the low bandwidth bus slaves P118A-D. Furthermore, the SoC interconnect 108 includes the arbiter 110.

In addition as shown in FIG. 4, the bus masters 410A-C are communicatively coupled to the SoC interconnect 108 via the bus master interfaces 104A-C. In addition, the SoC 400 includes the high bandwidth bus 106 which communicatively couples the bus masters 410A-C and the high bandwidth bus slaves H112A-D via the SoC interconnect 108. Exemplary high bandwidth bus 106 includes the AHB, the AXI, or any other high bandwidth bus capable of transferring an early read transaction request to the bridge circuit 430 or any other bus capable of providing similar bus bandwidth characteristics.

Also, as shown in FIG. 4, the bridge circuit 430 is coupled between the high bandwidth bus 106 and the low bandwidth bus 116. Exemplary low bandwidth bus 116 includes the APB, any other low bandwidth bus capable of interacting with the bridge circuit 430 or any other bus capable of providing similar bus bandwidth characteristics. Moreover as shown in FIG. 4, the low bandwidth bus slaves P118A-D are coupled to the low bandwidth bus 116.

In one embodiment, the bus masters 410A-C are configured to access the low bandwidth bus slaves P118A-D by issuing the early read transaction request in advance to a scheduled read transaction request associated with the low bandwidth bus slaves P118A-D. Further in this embodiment, the early request blocks 420A-C, shown in FIG. 4, in the bus masters 410A-C are configured to issue the early read transaction request. In operation, the bridge circuit 430 receives the early read transaction request from the bus masters 410A-C and converts it to a low bandwidth bus read transaction request. Further, the low bandwidth bus read transaction request is sent to the associated one of the low bandwidth bus slaves P118A-D via the low bandwidth bus 116 to fetch data associated with the early read transaction request.

Furthermore, the bridge circuit 430 receives the scheduled read transaction request and converts the scheduled read transaction request to the low bandwidth bus read transaction request. In addition, the fetched data associated with the early read transaction request corresponding to the one of the low bandwidth bus slaves P118A-D is sent to the bus masters 410A-C via the bridge circuit 430 and the high bandwidth bus 106 upon receiving the scheduled read transaction request. Also in this embodiment, the early read transaction request and a scheduled read/write transaction request to the low bandwidth bus slaves P118A-D are processed substantially simultaneously by the bridge circuit 430. Moreover in this embodiment, a read transaction in response to the early read transaction request and a write transaction in response to a scheduled write transaction request to the low bandwidth bus slaves P118A-D are initiated substantially simultaneously by the bridge circuit 430. The bridge circuit 430 is explained in more detail with reference to FIGS. 5 and 6.

Figure 5:
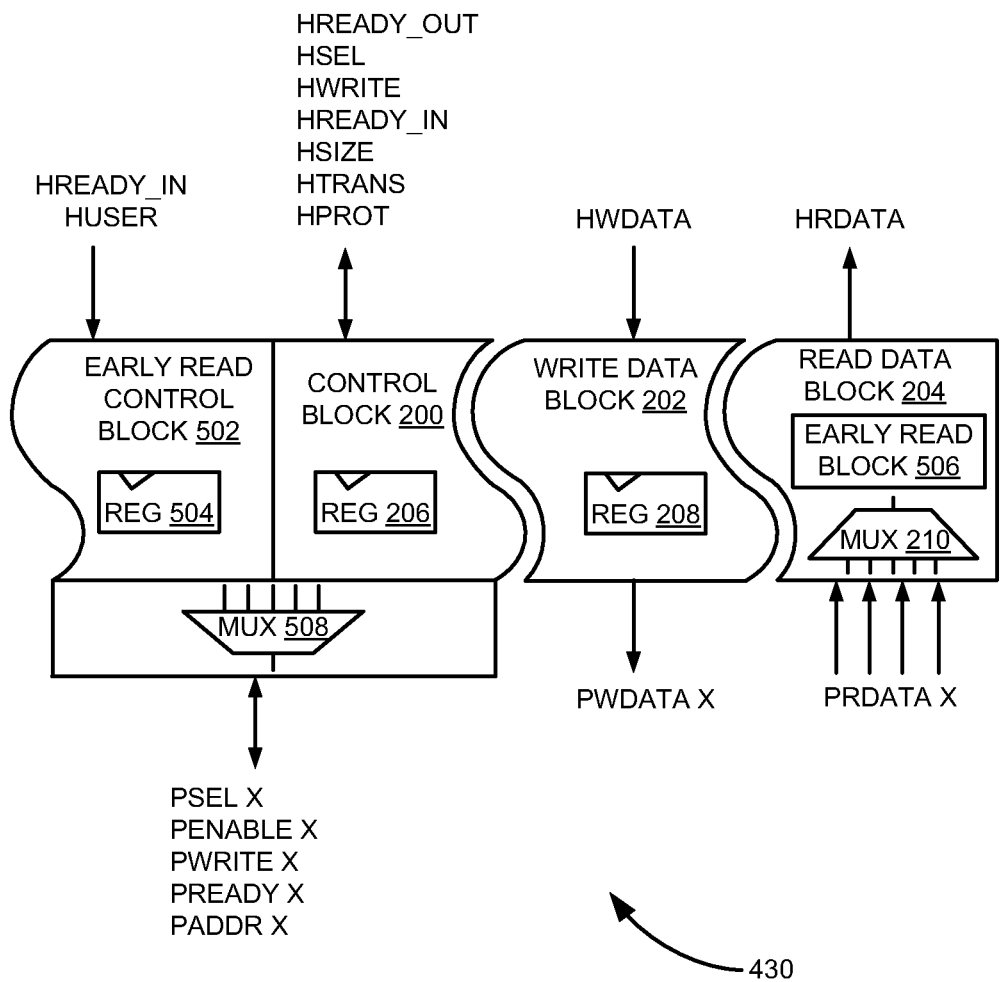
FIG. 5 is a block diagram illustrating major elements of a bridge circuit of the SoC, such as those shown in FIG. 4, according to an embodiment of the invention.

Referring now to FIG. 5, which illustrates a block diagram of major elements of the bridge circuit 430 of the SoC 400, such as those shown in FIG. 4, according to an embodiment of the invention. The bridge circuit 430 is similar to the bridge circuit 114 shown in FIG. 2, except that the bridge circuit 430 includes an early read control block 502, an early read block 506 and a MUX 508. Further as shown in FIG. 5, the early read control block 502 includes a register stage REG 504. Furthermore as shown in FIG. 5, the bridge circuit 430 includes the control block 200, the write data block 202 and the read data block 204. In addition as shown in FIG. 5, the control block 200 includes the REG 206, the write data block 202 includes the REG 208 and the read data block 204 includes the MUX 210. Also as shown in FIG. 5, the read data block 204 includes the early read block 506. Moreover as shown in FIG. 5, the early read control block 502, the control block 200, the write data block 202 and the read data block 204 are configured to interface with the high bandwidth bus 106 and the low bandwidth bus 116.

In operation, the early read control block 502 and the control block 200 carries the control information between the high bandwidth bus 106 and the low bandwidth bus 116. In one embodiment, the control information that is in the high bandwidth bus format coming via the high bandwidth bus 106 to the early read control block 502 includes control signals, such as the HREADY_IN with an additional input control signal, user information (HUSER). The HUSER includes the early read transaction request issued by the bus masters 410A-C simultaneously with the other control information. Further, the HUSER carries information regarding the low bandwidth bus slaves P118A-D and the registers in the low bandwidth bus slaves P118A-D to be accessed during a read access. Furthermore in this embodiment, the control information that is in the high bandwidth bus format coming via the high bandwidth bus 106 to the control block 200 includes the control signals, such as the HREADY_OUT, the HSEL, the HWRITE, the HREADY_IN, the HSIZE, the HTRANS, the HPROT and the like.

Further in operation, the control information that is in the high bandwidth bus format coming via the high bandwidth bus 106 is converted to the low bandwidth bus format in the early read control block 502 and the control block 200. The associated converted control information that is in the low bandwidth bus format includes control signals, such as the PSEL X, the PENABLE X, the PWRITE X, the PREADY X, the PADDR X and the like. Furthermore, the early read control block 502 decodes the information in HUSER. In addition, the early read control block 502 processes the early read transaction request from the bus masters 410A-C. Also, the early read control block 502 initiates the read transaction to the low bandwidth bus slaves P118A-D via the low bandwidth bus 116.

Furthermore in operation, the control block 200 processes the scheduled read/write information request from the bus masters 410A-C. Moreover, the control block 200 initiates the write transaction to the low bandwidth bus slaves P118A-D via the low bandwidth bus 116. Also, the control signals PSEL X, PENABLE X, PWRITE X, PREADY X and PAADR X are multiplexed in the MUX 508 between the early read control block 502 and the control block 200 for each of the low bandwidth bus slaves P118A-D.

Also, the write data block 202 receives the HWDATA in response to a write transaction request from the bus masters 410A-C via the high bandwidth bus 106. In addition, the received HWDATA is converted to the PWDATA. Also, the write data block 202 forwards the PWDATA to the associated one of the low bandwidth bus slaves P118A-D via the low bandwidth bus 116.

Further in operation, the read data block 204 receives the PRDATA X from the low bandwidth bus slaves P118A-D via the low bandwidth bus 116. The PRDATA X is received in response to the early read transaction request from the bus masters 410A-C. Moreover, in this embodiment, the early read block 506 stores the PRDATA X corresponding to the early read transaction request. Furthermore, the read data block 204 converts the PRDATA X to the HRDATA and forwards the HRDATA to the associated one of the bus masters 410A-C via the high bandwidth bus 106 in response to the scheduled read transaction request from the bus masters 410A-C. The flow of transactions, as described above and also as explained in more detail with reference to FIG. 6, via the bridge circuit 430 improves the bandwidth performance of the SoC 400.

Referring now to FIG. 6, which illustrates a table 600 showing transaction flows via the high bandwidth bus 106 to the bridge circuit 430 and then to the low bandwidth bus 116 in the SoC 400, such as those shown in FIG. 4, according to an embodiment of the invention. The table 600 is similar to the table 300 shown in FIG. 3, except that the table 600 includes two additional rows, such as HIGH_BANDWIDTH_USER 602 and LOW_BANDWIDTH_EARLY_READ_TRANS_ FLOW 612. Further as shown in FIG. 6, the HIGH_BAND- WIDTH_USER row 602 includes the early read transaction request issued one or more cycles before the scheduled read transaction request control information is issued. Furthermore, the LOW_BANDWIDTH_EARLY_READ_TRANS_FLOW row 612 includes the transaction flow associated with the low bandwidth bus slaves P118A-D in response to the issued early read transaction request.

Similar to the table 300, the table 600 also includes HX_Y, which represents a transaction Y, where Y is a read (R) or a write (W) transaction associated with a high bandwidth bus slave HX, wherein X is any one of the high bandwidth bus slaves H112A-D. Further, PX_Y represents a transaction Y, where Y is a read (R) or a write (W) transaction associated with a low bandwidth bus slave PX, wherein X is any one of the low bandwidth bus slaves P118A-D.

Further as shown in FIG. 6, each column in the table 600 includes an exemplary cycle, such as CY1, CY2 and so on. As shown in the table 600, the row 602 includes high bandwidth early read transaction request (HIGH BANDWIDTH_USER) issued by the bus masters 410A-C via the high bandwidth bus 106 to the early read control block 502. Further as shown in the table 600, a row 604 includes the HIGH BANDWIDTH_CTRL on the high bandwidth bus 106, associated with the high bandwidth bus slaves H112A-D and the low bandwidth bus slaves P118A-D. Furthermore as shown in the table 600, a row 606 includes the HIGH BANDWIDTH_WRITE_DATA information associated with the high bandwidth bus slaves H112A-D and the low bandwidth bus slaves P118A-D, issued by the bus masters 410A-C via the high bandwidth bus 106. Also as shown in the table 600, a row 608 includes HIGH_BANDWIDTH_READ_DATA information associated with the high bandwidth bus slaves H112A-D and the low bandwidth bus slaves P118A-D. In addition as shown in the table 600, a row 610 includes the LOW_BANDWIDTH_TRANS_FLOW information associated with the low bandwidth bus slaves P118A-D. Also as shown in the table 600, the row 612 includes low bandwidth bus slave transaction flow (LOW_BANDWIDTH_EARLY_READ_TRANS_FLOW) information associated with the low bandwidth bus slaves P118A-D issued in response to the early read transaction request.

Now, referring to CY1 in the table 600, read transaction request control information H0_R, as shown in the row 604, is issued by the bus masters 410A-C to access the high bandwidth bus slave H112A via the high bandwidth bus 106. The transaction H0_R associated with the high bandwidth bus slave H112A is serviced substantially immediately in CY 2. In CY2, the read data H0_RD, as shown in the row 608, associated with the transaction H0_R, is read from the high bandwidth bus slave H112A and transferred to the associated one of the bus masters 410A-C. In parallel, in CY2, write transaction request control information H1_W, as shown in the row 604, is issued by one of the bus masters 410A-C to access the high bandwidth bus slave H112B. Similar to the transaction H0_R, the transaction H1_W associated with the high bandwidth bus slave H112B is also serviced substantially immediately in CY3.

In CY3, the write data H1_WD, as shown in the row 606, associated with the transaction H1_W, is obtained from the associated one of the bus masters 410A-C to complete the transaction H1_W. Further, in CY3, a write transaction request control information P0_W, as shown in the row 604, is issued by one of the bus masters 410A-C to access the low bandwidth bus slave P118A. Further, as shown in the table 600, an early read transaction request P1_R, as shown in the row 602, associated with a read transaction request P1_R, is issued to access the low bandwidth bus slave P118B. P1_R and P0_W are transferred simultaneously via the early read control block 502 and the control block 500, since they are independent paths in the bridge circuit 430, as shown in FIG. 5.

In CY4, write data P0_WD, as shown in the row 606, associated with the transaction P0_W is obtained. Furthermore, the transaction P0_W is serviced in two phases, i.e., during the setup phase (S) in CY5 (P0_W (S)) and the access phase (A) in CY6 (P0_W (A)), as shown in the row 610. Meanwhile, the early read transaction request P1_R issued in CY3 is substantially immediately transferred to the low bandwidth bus slave P118B by the bridge circuit 430. Furthermore, P1_R is serviced in CY4 (P1_R(S)) and CY5 (P1_R (A)), as shown in the row 612, and the read data P1_RD is made available. Therefore, when the scheduled read transaction request control information P1_R is issued in CY4, as shown in the row 604, it is substantially immediately serviced and the fetched read data P1_RD is obtained and transferred in CY5, as shown in the row 608. As a result, the read transaction request P1_R is serviced substantially immediately without any delay.

In CY5, read transaction request control information H2_R, as shown in the row 604, is issued by the bus masters 410A-C to access the high bandwidth bus slave H112C. In parallel, an early read transaction request P2_R, as shown in the row 602, associated with a read transaction request P2_R, is issued to access the low bandwidth bus slave P118C. Since the servicing of the previous transactions is completed, the high bandwidth bus 106 can receive further transaction requests from the bus masters 410A-C without any delay. Therefore, the idle time of the high bandwidth bus 106 is significantly reduced.

Further in this embodiment, the transaction H2_R is serviced substantially immediately and the read data H2_RD, as shown in the row 608, is obtained from the high bandwidth bus slave H112C in CY6. Furthermore in this embodiment, the early read transaction request P2_R is substantially immediately transferred to the low bandwidth bus slave P118C by the bridge circuit 430 and is serviced in CY6 (P2_R(S)) and CY7 (P2_R (A)), as shown in the row 612 and the read data P2_RD, associated with the early read transaction request P2_R is made available. Therefore, when the scheduled read transaction request control information P2_R, as shown in the row 604, is issued in CY6, it is substantially immediately serviced and the fetched read data P2_RD is obtained and transferred in CY7. As a result, the read transaction request P2_R is serviced substantially immediately without any delay.

Figure 7:
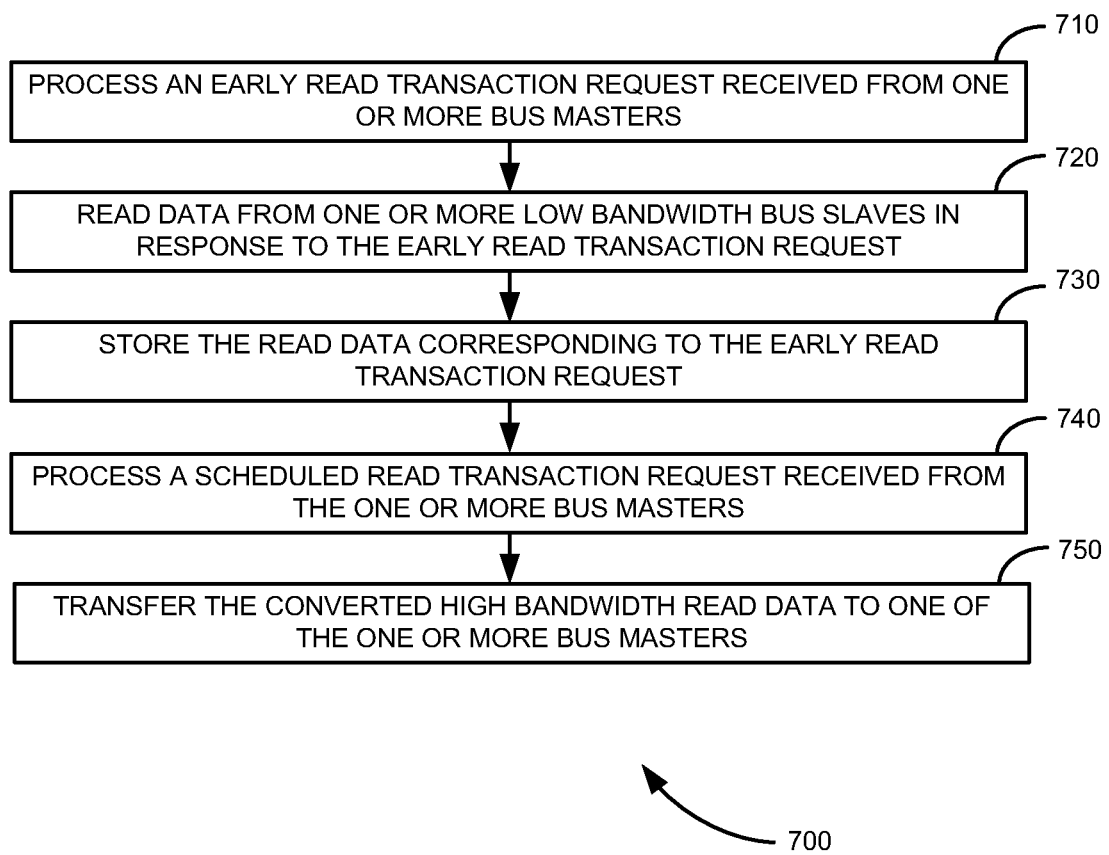
FIG. 7 illustrates a flow diagram of a method for improving bandwidth performance during high latency peripheral read accesses in the SoC shown in FIG. 4, according to an embodiment of the invention.

Referring now to FIG. 7, which illustrates a flow diagram 700 of a method for improving bandwidth performance during high latency peripheral read accesses in the SoC 400 shown in FIG. 4, according to an embodiment of the invention. In block 710, the early read transaction request received from the bus masters is processed and the read transaction is initiated to one of the low bandwidth bus slaves via the low bandwidth bus by the bridge circuit. Exemplary bus masters include one or more processors, one or more DMAs, one or more DSPs and/or any other bus master capable of initiating read/write transaction requests. Further, exemplary low bandwidth bus slaves include the GPIO, the UART, the SSP and the like. Furthermore, exemplary low bandwidth bus includes the APB, any other low bandwidth bus capable of interacting with the bridge circuit or any other bus capable of providing similar bus bandwidth characteristics.

In block 720, the data is read from the low bandwidth bus slaves in response to the early read transaction request received from the bus masters. Further, the read data is converted to high bandwidth bus read data. In block 730, the data corresponding to the early read transaction request is stored by the bridge circuit. In an exemplary scenario, the data may not be stored by the bridge circuit and can be transferred directly to one of the bus masters.

In block 740, the scheduled read transaction request received from the bus masters is processed. In block 750, the converted high bandwidth read data is transferred to one of the bus masters via the high bandwidth bus by the bridge circuit in response to the scheduled read transaction request. This is explained in more detail with reference to FIGS. 4-6. Exemplary high bandwidth bus includes the AHB, the AXI, any other high bandwidth bus capable of transferring of the early read transaction request to the bridge circuit or any other bus capable of providing similar bus bandwidth characteristics.

In various embodiments, the methods and systems described in FIGS. 1 through 7 propose a bridge circuit for a SoC which reduces effective time required by the bus masters to access the low bandwidth bus slaves. Also, the bridge circuit provides an improved system performance by removing any idle cycles present during the high bandwidth transactions.

Although the present embodiments have been described with reference to specific example embodiments, it will be evident that various modifications and changes may be made to these embodiments without departing from the broader scope of the various embodiments. Furthermore, the various devices, modules, analyzers, generators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods may be embodied using transistors, logic gates, and electrical circuits, such as an application specific integrated circuit.

What is claimed is:

1. A system-on-chip (SoC), comprising:
   one or more bus masters;
   at least one high bandwidth bus slave;
   a high bandwidth bus communicatively coupled to the one or more bus masters and the at least one high bandwidth bus slave;
   a low bandwidth bus;
   a bridge circuit coupled between the high bandwidth bus and the low bandwidth bus; and
   at least one low bandwidth bus slave coupled to the low bandwidth bus, wherein the one or more bus masters are configured to access the at least one low bandwidth bus slave, wherein the one or more bus masters issue an early read transaction request in advance to a scheduled read transaction request associated with one of the at least one low bandwidth bus slave,
   wherein the bridge circuit is configured to receive the early read transaction request and convert the early read transaction request to a low bandwidth bus read transaction request and send the low bandwidth bus read transaction request to one of the at least one low bandwidth bus slave via the low bandwidth bus to fetch data associated with the early read transaction request, and
   wherein the bridge circuit is further configured to receive the scheduled read transaction request and convert the scheduled read transaction request to a low bandwidth bus read transaction request, and wherein the fetched data associated with the early read transaction request corresponding to the one of the at least one low bandwidth bus slave is sent to the one or more bus masters via the bridge circuit and the high bandwidth bus upon receiving the scheduled read transaction request.

2. The SoC of claim 1, wherein the one or more bus masters are selected from the group consisting of one or more processors, one or more direct memory accesses (DMAs) and one or more digital signal processors (DSPs).

3. The SoC of claim 1, wherein the at least one high bandwidth bus slave comprises a peripheral DMA.

4. The SoC of claim 1, wherein the at least one low bandwidth bus slave comprises at least one peripheral device selected from the group consisting of a general purpose I/O (GPIO), a universal asynchronous receiver/transmitter (UART), and a synchronous serial peripheral interface (SSP).

5. The SoC of claim 1, wherein the high bandwidth bus comprises an advanced high performance bus (AHB) or an advanced extensible interface (AXI).

6. The SoC of claim 1, wherein the low bandwidth bus comprises an advanced peripheral bus (APB).

7. The SoC of claim 1, wherein the bridge circuit is further configured to process substantially simultaneously the early read transaction request and a scheduled read/write transaction request to the at least one low bandwidth bus slave.

8. The SoC of claim 1, wherein the bridge circuit is further configured to initiate substantially simultaneously a read transaction in response to the early read transaction request and a write transaction in response to a scheduled write transaction request to the at least one low bandwidth bus slave.

9. A bridge circuit, comprising:
   an early read control block configured to interface with a high bandwidth bus and a low bandwidth bus, process an early read transaction request from one or more bus masters and initiate a read transaction to one of the at least one low bandwidth bus slave via the low bandwidth bus;
   a control block configured to interface with the high bandwidth bus and the low bandwidth bus, process a scheduled read/write transaction request from the one or more bus masters and initiate a write transaction to one of the at least one low bandwidth bus slave via the low bandwidth bus;
   a write data block configured to interface with the high bandwidth bus and the low bandwidth bus, receive write data from the one or more bus masters via the high bandwidth bus and convert the received write data to a low bandwidth bus write data format and forward the converted low bandwidth write data to an associated one of the at least one low bandwidth bus slave via the low bandwidth bus; and
   a read data block configured to interface with the high bandwidth bus and the low bandwidth bus, read data received from the at least one low bandwidth bus slave via the low bandwidth bus in response to the early read transaction request from the one or more bus masters and convert it to high bandwidth bus read data format and forward the converted high bandwidth read data to the one of the one or more bus masters via the high bandwidth bus on receiving the scheduled read transaction request from one of the one or more bus masters.

10. The circuit of claim 9, wherein the read data block comprises an early read block and wherein the early read block stores the data corresponding to the early read transaction request.

11. The circuit of claim 9, wherein the one or more bus masters are selected from the group consisting of one or more processors, one or more direct memory accesses (DMAs) and one or more digital signal processors (DSPs).

12. The circuit of claim 9, wherein at least one low bandwidth bus slave comprises at least one peripheral device selected from the group consisting of a general purpose I/O (GPIO), a universal asynchronous receiver/transmitter (UART) and a synchronous serial peripheral interface (SSP).

13. The circuit of claim 9, wherein the high bandwidth bus comprises an advanced high performance bus (AHB) or an advanced extensible interface (AXI).

14. The circuit of claim 9, wherein the low bandwidth bus comprises an advanced peripheral bus (APB).

15. A method for improving system-on-chip (SoC) bandwidth performance during high latency peripheral read accesses, wherein the SoC includes a bridge circuit, one or more bus masters, at least one high bandwidth bus slave and at least one low bandwidth bus slave that are communicatively coupled via a high bandwidth bus and a low bandwidth bus, the method comprising:
processing an early read transaction request received from the one or more bus masters and initiating a read transaction to one of the at least one low bandwidth bus slave via the low bandwidth bus by the bridge circuit;
reading data from the at least one low bandwidth bus slave in response to the early read transaction request received from the one or more bus masters, and converting the read data to a high bandwidth bus read data;
processing a scheduled read transaction request received from the one or more bus masters; and
transferring the converted high bandwidth read data to one of the one or more bus masters via the high bandwidth bus by the bridge circuit in response to the scheduled read transaction request.

16. The method of claim 15, further comprising:
storing the data corresponding to the early read transaction request by the bridge circuit.

17. The method of claim 15, wherein the one or more bus masters are selected from the group consisting of one or more processors, one or more direct memory accesses (DMAs) and one or more digital signal processors (DSPs).

18. The method of claim 15, wherein the at least one high bandwidth bus slave comprises a peripheral DMA.

19. The method of claim 15, wherein the at least one low bandwidth bus slave comprises at least one peripheral device selected from the group consisting of a general purpose I/O (GPIO), a universal asynchronous receiver/transmitter (UART) and a synchronous serial peripheral interface (SSP).

20. The method of claim 15, wherein the high bandwidth bus comprises an advanced high performance bus (AHB) or an advanced extensible interface (AXI).

21. The method of claim 15, wherein the low bandwidth bus comprises an advanced peripheral bus (APB).

* * * * *